Figure 1:
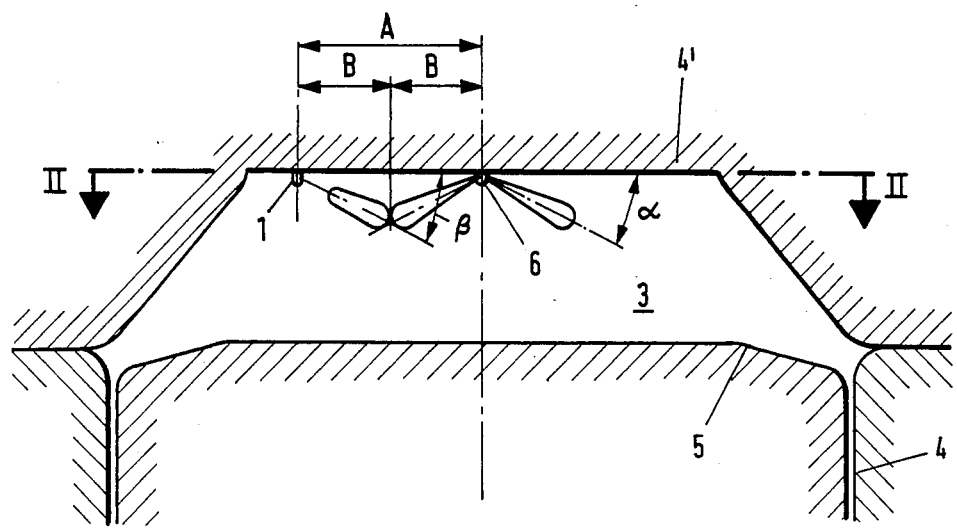

United States Patent [19]

Steiger et al.

[11] Patent Number: 4,748,949
[45] Date of Patent: Jun. 7, 1988

[54] METHOD AND SYSTEM FOR INJECTING A PILOT FUEL INTO A COMBUSTION CHAMBER

[75] Inventors: Anton Steiger, Illnau; Bruno Sommer, Winterthur, both of Switzerland

[73] Assignee: Sulzer Brothers Limited, Winterthur, Switzerland

[21] Appl. No.: 759,949

[22] Filed: Jul. 29, 1985

[30] Foreign Application Priority Data

Feb. 5, 1985 [CH] Switzerland .......................... 507/85

[51] Int. Cl.$^4$ ........................ F02D 19/08; F02M 59/26
[52] U.S. Cl. ................................... 123/299; 123/1 A; 123/446; 123/500
[58] Field of Search ............... 123/1 A, 276, 279, 299, 123/300, 446, 450, 500; 417/471, 494, 499

[56] References Cited

U.S. PATENT DOCUMENTS

| | | | |
|---|---|---|---|
| 1,494,020 | 5/1924 | Riehm | 123/305 |
| 1,767,701 | 6/1930 | Riehm | 123/299 |
| 1,904,799 | 4/1933 | Palmer | 417/471 |
| 2,132,083 | 10/1938 | Pescara | 123/275 |
| 2,692,587 | 10/1954 | Barber | 123/299 X |
| 3,792,692 | 2/1974 | Kiley | 417/494 |
| 4,368,702 | 1/1983 | Finsterwalder et al. | 123/1 A X |
| 4,388,908 | 6/1983 | Babitzka et al. | 123/500 |
| 4,440,134 | 4/1984 | Nakao et al. | 123/450 X |
| 4,543,930 | 10/1985 | Baker | 123/299 |

FOREIGN PATENT DOCUMENTS

| | | | |
|---|---|---|---|
| 851570 | 10/1952 | Fed. Rep. of Germany | 123/300 |
| 909645 | 4/1954 | Fed. Rep. of Germany | 123/299 |
| 3212277 | 10/1983 | Fed. Rep. of Germany | 123/300 |

Primary Examiner—Tony M. Argenbright
Attorney, Agent, or Firm—Kenyon & Kenyon

[57] ABSTRACT

The fuel injection system is provided with a control device for controlling the pilot fuel injection phase to be less than ten percent of the main fuel injection phase. In one embodiment, an injection pump is constructed with a piston having a part with a pair of bevelled edges which control the start and end of injection as well as a tension spring for abruptly moving the piston in the delivery stroke. In another embodiment, a control device includes a rotatable spool which has a cross-bore for communicating cyclically with a pair of radial bores in a surrounding sleeve and which, in turn, communicate with oppositely disposed bores in a casing in order to deliver a flow of pilot fuel during the injection phase.

11 Claims, 6 Drawing Sheets

METHOD AND SYSTEM FOR INJECTING A PILOT FUEL INTO A COMBUSTION CHAMBER

This invention relates to a method and system for injecting pilot fuel into a combustion chamber and, particularly, a combustion chamber of a reciprocating diesel internal combustion engine.

As is known, reciprocating diesel internal combustion engines frequently have a combustion chamber associated with an injection nozzle for a pilot fuel and an injection nozzle for a liquid main fuel which is difficult to ignite. In this respect, a liquid main fuel which is difficult to ignite is to be understood as denoting a fuel having a very low cetane rating, such as methanol or a supension of solid finely divided fuel particles, such as petroleum coke or coal, in a liquid, such as water. In some cases, the fuel particles are of size of from five (5) to twenty (20) μm. Suspensions of this kind are known as slurries.

In the past, various types of systems have been used for injecting the pilot fuel and the main fuel into the combustion chamber of the engine. For example, German OS No. 3212,277 describes an injection system wherein conventional, i.e. cam-operated, displacement pumps are provided, one for supplying the pilot fuel and another for supplying the main fuel. In this system, the pilot fuel injection phase is shorter than the main fuel injection phase. The minimum of the pilot fuel injection phase corresponds to ten percent (10%) of the main fuel injection phase. A pilot fuel quantity of approximately five percent (5%) to ten percent (10%) of the calorific value of the main fuel corresponds to this ten percent (10%) injection phase and the injection of this quantity of pilot fuel takes ten (10) or more milliseconds.

It has been found that smaller quantities of pilot fuel than the quantities which can be supplied during the ten percent (10%) phase are sufficient to ignite the main fuel. However, using cam-operated displacement pumps makes it impossible to reduce the injection phase below ten percent.

Accordingly, it is an object of the invention to provide an improved injection method for a reciprocating diesel internal combustion engine.

It is another object of the invention to provide a fuel injection method for injecting pilot fuel quantities of less than ten percent of the main fuel for combustion purposes.

It is another object of the invention to provide a relatively simple means for reducing the consumption of costly pilot fuel in a reciprocating diesel internal combustion engine.

Briefly, the invention provides a method for injecting fuel into a combustion chamber of a reciprocating diesel internal combustion engine which uses a minimum of pilot fuel. To this end, the method includes injecting a liquid main fuel into the combustion chamber during a main fuel injection phase and injecting a pilot fuel into the combustion chamber during a pilot fuel injection phase. Furthermore during the injection phase of the main fuel the pilot fuel is being injected at a duration which is less than ten percent of the injection phase of the main fuel, the beginning of pilot fuel injection phase relative to the beginning of the main fuel injection phase is such that the pilot fuel injected into said combustion chamber meets the main fuel injected into said combustion chamber essentially half way between said two nozzles, the distance between the pilot fuel nozzle and the main fuel nozzle is being selected according to the formula $$A = 2t_v c_B,$$

whereby $t_v$ represents the ignition lag of the pilot fuel and $c_B$ represents the exit velocity of the pilot fuel from the second nozzle, and the duration of ignition of the pilot fuel is less than the time $t_v$.

In addition to the reduced consumption of pilot fuel, there is a further advantage that with such small injection quantities, which are appreciably below the quantity required for idling, no quantity adjustment or control is necessary since it is sufficient to have merely timing control.

The invention also provides a system for injecting fuel into a combustion chamber of a reciprocating diesel internal combustion engine. To this end, the system includes a first injection nozzle with a plurality of spray apertures for injecting a liquid main fuel into the combustion chamber during a main fuel injection phase and a second injection nozzle for injecting a pilot fuel into the combustion chamber during a pilot fuel injection phase. The second nozzle is provided with one to maximum of three spray apertures and the axes of adjacent spray apertures of the two nozzles are directed in such a way that they meet in the middle between the two nozzles.

In one embodiment, the injection nozzle for the pilot fuel may include a flow path for the pilot fuel, a seat surface in the path and a spring biased valve needle for cyclically seating on the seat to open and close the flow path. With this construction, the control means includes an injection or displacement pump having a cylinder, a fuel supply orifice in the cylinder to receive a supply of fuel, a fuel delivery orifice in the cylinder to eject fuel therefrom and a piston which is reciprocably mounted in the cylinder for ejecting pilot fuel from the cylinder through the fuel delivery orifice. In addition, the piston includes a pair of parallel bevelled edges which cooperate with the fuel supply orifice whereby one edge determines a start of the pilot fuel injection phase and the other edge determines the end of the pilot fuel injection phase. In addition, the pump includes a pivotally mounted lever which bears on the piston at an end remote from the bevelled edges and a tension spring which is secured to the level to move the piston abruptly for delivery of pilot fuel through the delivery orifice, that is, on the delivery stroke of the piston.

The above construction differs from previously known cam-operated displacement pumps in that instead of driving the piston via a cam during the delivery stroke, the piston is driven by a tension spring. Hence, the small quantity of fuel determined by the distance between the two bevelled edges can be injected into the combustion chamber in a very short time of approximately one millisecond.

The piston may also be rotatably adjustable about a longitudinal axis so that the timing of the injection phase can be varied by turning of the piston.

In another embodiment, the pilot fuel injection nozzle is constructed with a gallery for receiving pilot fuel at injection pressure, a valve needle for controlling a flow of the fuel from the gallery to the combustion chamber, a thickened end on the valve needle, a biasing piston communicating with the gallery and contacting the thickened end of the valve needle for maintaining the valve needle closed in intervals between the injection phases and a source of hydraulic pressure medium communicating through the control means with the end of the valve needle on a side opposite the biasing piston in order to oppose a closing force of the biasing piston. With this embodiment, a timed injection nozzle is used which also enables very small quantities of fuels to be injected in a period of approximately one millisecond.

The control means used with the above embodiment may be in the form of a control device comprising a casing, a sleeve mounted in the casing and a valve spool rotatably mounted in the sleeve. In this regard, the casing is constructed with a central bore and a pair of diametrically disposed bores which communicate with the central bore in order to pass a flow of liquid fuel therethrough. The sleeve is mounted in the central bore and has a pair of circumferentially elongated and oppositely disposed peripheral grooves each of which is in communication with a respective one of the pair of bores in the casing. In addition, the sleeve has a pair of radial bores each of which is in communication with a respective one of the pair of bores in the casing. The valve spool is provided with a cross-bore for cyclically communicating with the radial bores of the sleeve whereby a simultaneous communication of the cross-bore with the radial bores of the sleeve determines a fuel injection phase. The radial bores of the sleeve are disposed in non-diametric relation to each other so that the cross-bore, during rotation, initially communicates with only one bore in the sleeve, then with both bores and finally with only the second bore. The initial communication with the second bore determines the start of the injection phase while the termination of communication with the first bore determines the end of the injection phase.

Figure 2:
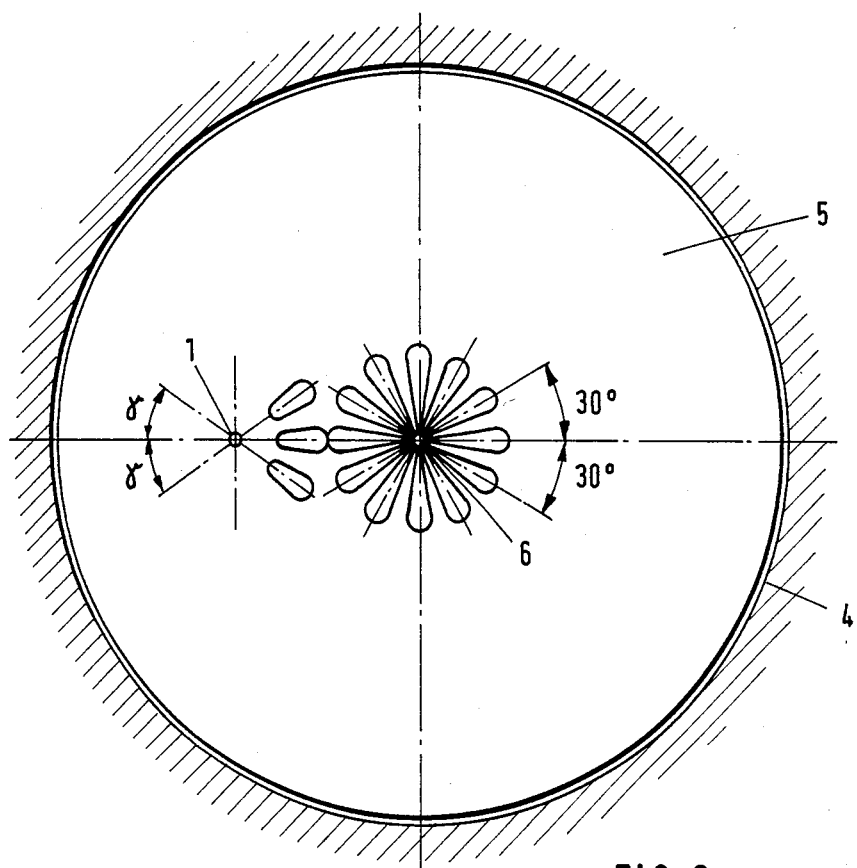
Figure 3:
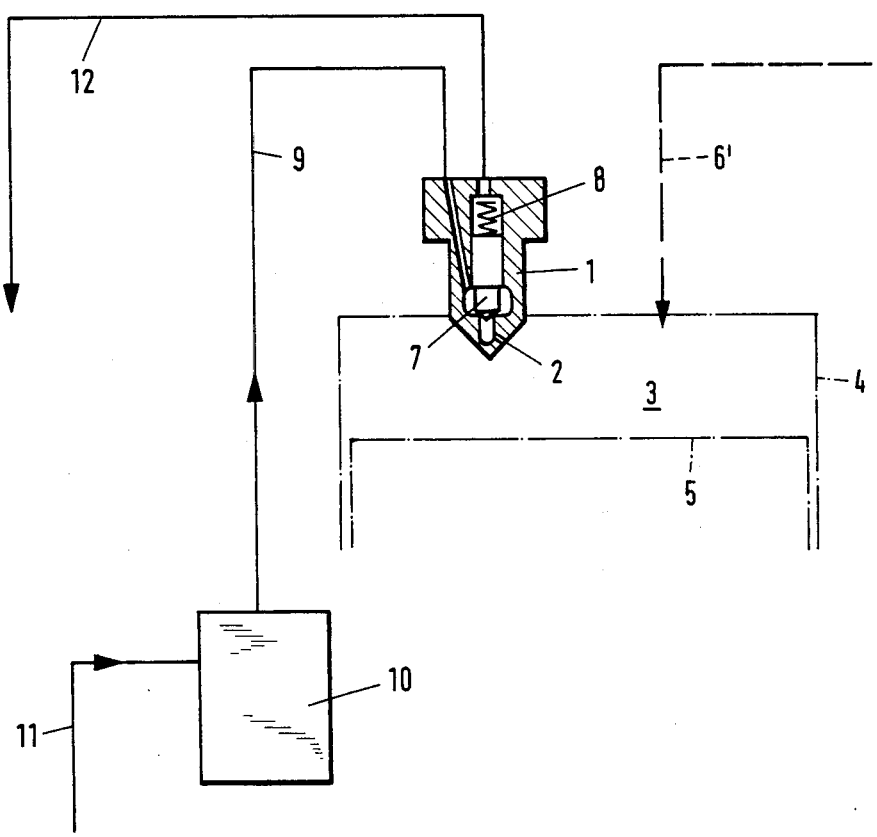
Figure 4:
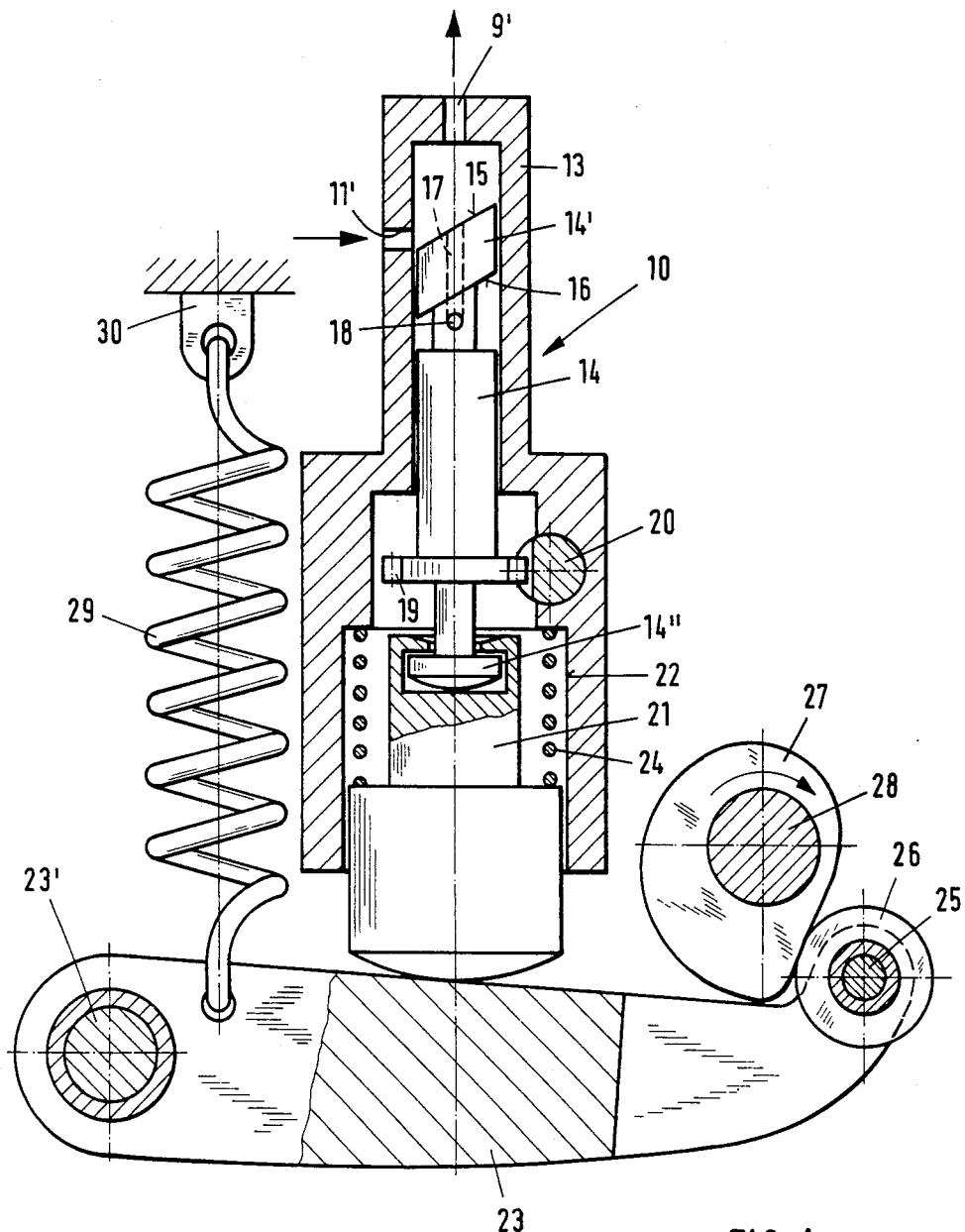
Figure 5:
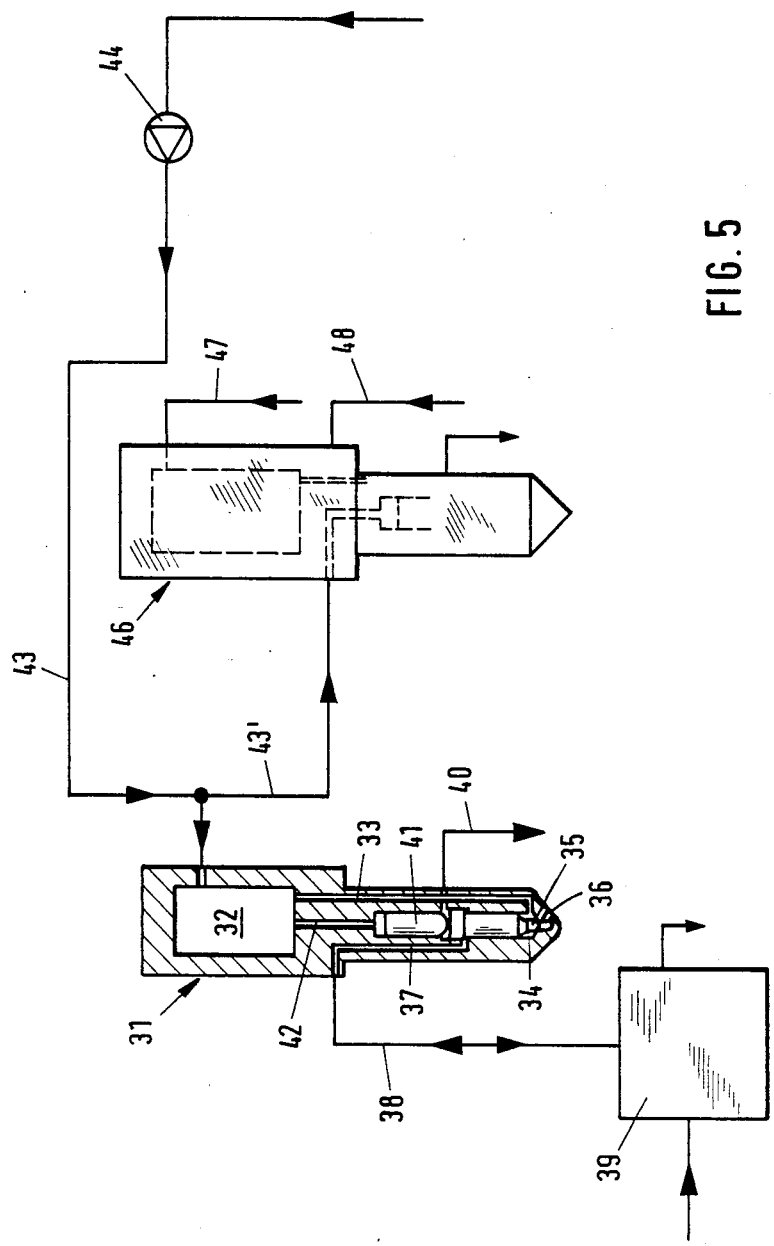
Figure 6:
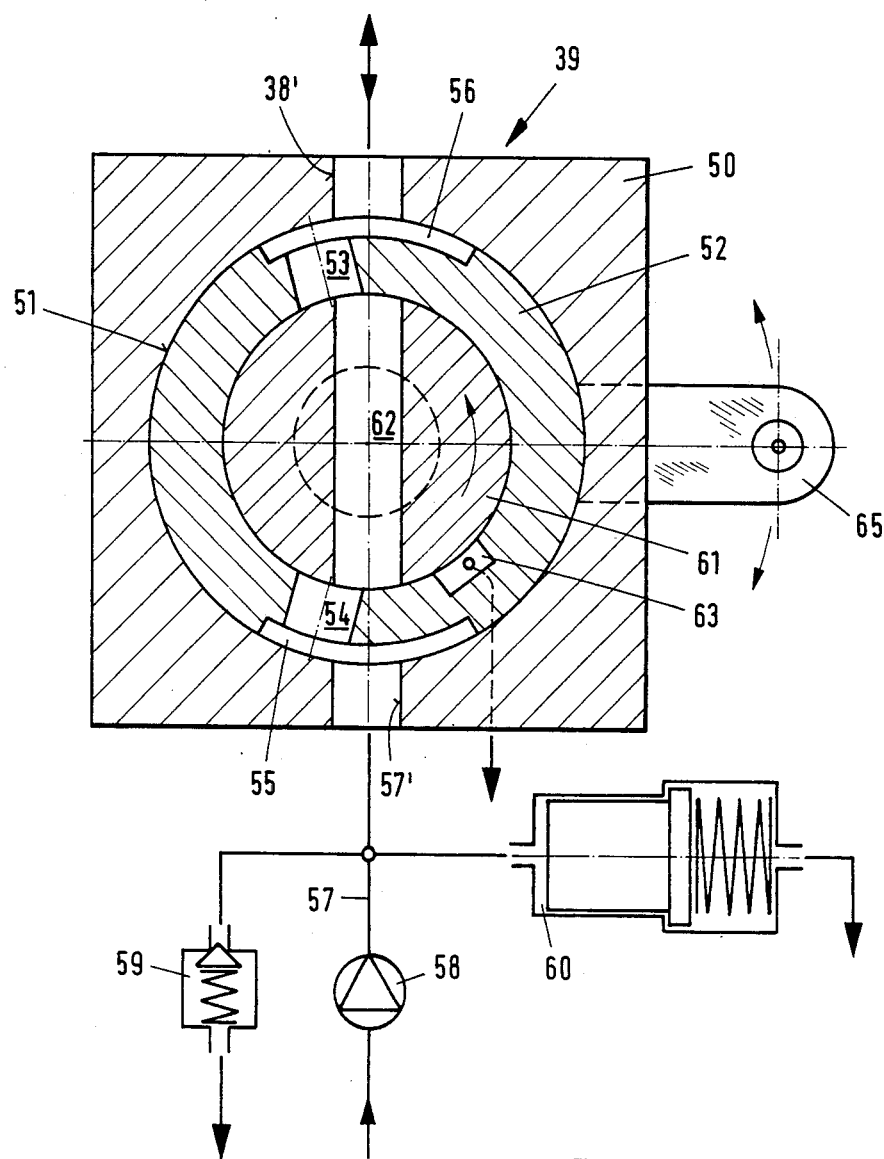
Figure 7:
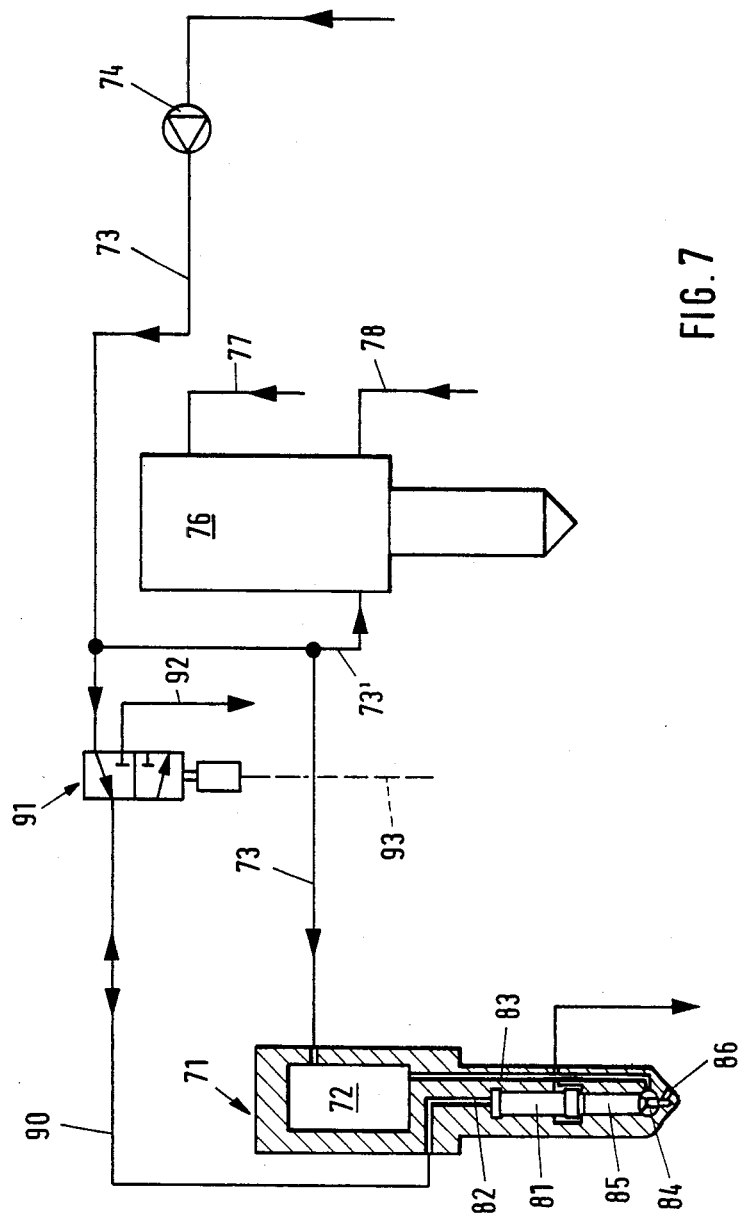

These and other objects and advantages of the invention will become apparent from the following detailed description taken in conjunction with the accompanying drawings wherein:

FIG. 1 diagrammatically illustrates a sectional view of a combustion chamber of an internal combustion engine constructed in accordance with the invention;

FIG. 2 is a section view taken on line II—II of FIG. 1;

FIG. 3 diagrammatically illustrates a fuel injection system for a combustion chamber of a reciprocating diesel internal combustion engine in accordance with the invention;

FIG. 4 illustrates a cross sectional view of a pilot fuel injection pump constructed in accordance with the invention;

FIG. 5 diagrammatically illustrates a system employing a timed injection nozzle in accordance with the invention;

FIG. 6 illustrates a control device for a timed injection nozzle in accordance with the invention; and FIG. 7 diagrammatically illustrates a further modified system according to the invention.

As shown in FIG. 1, a reciprocating diesel internal combustion engine contains a combustion chamber 3 which is essentially bounded by a cylinder cover 4' of a cylinder 4 and by a work piston 5 which moves up and down within the cylinder. In the center of the combustion chamber 3 is disposed a main fuel injection or first nozzle 6 from which is shown—for simplicity sake—only this part which contains a plurality of spray apertures. The main fuel is characterized by the fact that it has a very low cetane number or rating and is thus very hard to ignite. Furthermore, a second injection nozzle 1 for injecting a pilot fuel, for example diesel oil, is located excentrically within the combustion chamber 3 and contains a maximum of three spray apertures as shown in FIG. 2. These apertures are directed towards the first injection nozzle 6 for the main fuel whereby the axes of two neighboring spray apertures of the second nozzle 1 enclosed an angle $\gamma$ (FIG. 2). The first injection nozzle 6 contains in this embodiment twelve spray apertures which are equally distributed around the circumference of the nozzle which leads to an enclosed angle between the axes of two neighboring spray apertures of 30°. The angle $\gamma$ is to be selected in such a way that the axes of opposing spray apertures meet exactly half way between the nozzles 1 and 6. The axes of the spray apertures of the first nozzle 6 are, when viewed in a plane at a right angle to the longitudinal axis of the cylinder 4, inclined at an angle $\alpha$ towards the work piston 5. There is the corresponding angle $\beta$ for the spray apertures of the second nozzle 1 which angle is chosen according to a criterion which is analog to the one for the selection of the angle $\gamma$. As shown in FIG. 1, the amount of excentricity of the second injection nozzle 1 is the distance A, whereas the distance B—equal to A divided by 2—is selected according to the following relation: $B = t_v \cdot c_B$, whereby $t_v$ means the ignition delay of the pilot fuel and $c_B$ equals the exit velocity of the pilot fuel from the second nozzle 1.

According to the method of this invention the main fuel will be injected into the combustion chamber 3 by the first injection nozzle 6 and the pilot fuel will be injected by the second nozzle 1, whereby the duration of the injection of the pilot fuel shall be less than ten percent (10) of the duration of the injection of the main fuel. Further, the beginning of the injection of the pilot fuel relative to the beginning of the injection of the main fuel is such that the front end of the pilot fuel which is being injected into the combustion chamber will essentially meet the front end of a main fuel injected from the nozzle 6 in the middle between the two nozzles. This process is shown in FIGS. 1 and 2 as much as pilot fuel quantities leaving the three spray apertures of the second nozzle 1 fly in the form of fuel packages towards the opposing fuel jets of the main fuel. As for the three pilot fuel packages, the connection with the second injection nozzle 1 at the time of their meeting has already been interrupted. This is by no means the case for the main fuel jets. The duration of injection of the pilot fuel is for the present concept of pilot injection considerably shorter than the time interval required for the first pilot fuel drop leaving the second nozzle until ignition. In this way, it is possible to ignite the main fuel with an absolute minimum of pilot fuel quantity and yet achieve a secure and precise main fuel ignition, whereby the ignition flame spreads from there towards the rest of the main fuel jets.

Referring to FIG. 3, the second injection nozzle 1 for the pilot fuel has a bottom end which is formed with a maximum of three spray apertures 2 and which extends into the combustion chamber 3. The first injection nozzle (not shown) is provided via a line 6' with a liquid main fuel for injection into the combustion chamber 3 during a main fuel injection phase. This main fuel is of the difficult-to-ignite type and has a very low cetane rating.

The pilot fuel injection nozzle 1 includes a flow path for the pilot fuel, a seat surface in the path and a valve needle 7 which is biased by a spring 8 for seating on the seat surface in order to close the flow path between injection phases. This nozzle 1 is connected by way of a pressure line 9 to a control means in the form of an ejection pump 10 for controlling the pilot fuel injection phase so as to be less than ten percent of the main fuel injection phase. As indicated, the pump 10 receives the pilot fuel through a supply line 11 from a tank or other suitable source of pilot fuel.

During operation, while the nozzle 1 is in the injection phase, the pressure of the pilot fuel supplied through the line 9 is so great that the closing force of the spring 8 is overcome and the valve needle 7 disengages from the seat surface so that pilot fuel flows through the spray apertures 2 into the combustion chamber 3.

As indicated, a discharge line 12 is connected to the nozzle 1 so as to discharge leakage fuel from the nozzle 1.

Referring to FIG. 4, the injection pump 10 has a cylinder 13 with a fuel supply orifice or bore 11' to receive a supply of pilot fuel and a fuel delivery orifice or bore 9' to eject fuel therefrom. In addition, a piston 14 is reciprocably mounted in the cylinder 13 for ejecting pilot fuel from the cylinder through the fuel delivery orifice 9' as indicated by the arrow. As indicated, the piston 14 carries a part 14' at the upper end which has a pair of parallel bevelled edges 15, 16 which cooperate with the fuel supply orifice 11' whereby one edge 15 determines a start of the pilot fuel injection phase while the other edge 16 determines the end of the pilot fuel injection phase.

A central bore 17 extends through the part 14' to communicate with a cross-bore 18 below the part 14' for purposes as described below.

The pump 10 also has a suitable means for rotatably adjusting the piston 14 about a longitudinal axis thereof. As indicated, this means includes a toothed ring 19 on the piston 14 which cooperates with a rack 20 which is mounted so as to be movable lengthwise in the cylinder 13.

As indicated, the lower end 14" of the piston 14 is connected to an intermediate member 21 which is guided in a widened bore 22 of the cylinder 13 and bears by way of a bottom end on a pivotally mounted lever 23. A compression spring 24 is also received in the bore 22 to maintain the member 21 in permanent engagement with the lever 23.

The lever 23 is mounted at the left-hand end, as viewed, for pivoting about a pivot 23'. The opposite end of the lever 23 is forked to form two tines or prongs between which a roller 26 is rotatably mounted on a pivot pin 25. This roller 26 rolls on a cam 27 of a cam shaft 28 which rotates in clockwise manner, as viewed, when the injection pump 10 is in operation.

A strong tension spring 29 is pivotally secured to the lever 23 so as to move the piston 14 abruptly for delivery of the pilot fuel through the delivery orifice 9' during an injection phase. As indicated, the spring 29 is pivotally connected to the lever 23 between the pivot 23' and the point of engagement of the member 21. The opposite end of the spring 29 is secured to a fixedly mounted member 30.

The operation of the injection system of FIGS. 3 and 4 is as follows.

Referring to FIG. 4, with the cam 27 in the position illustrated, the piston 14 is in the process of making a delivery stroke because the roller 26 has just passed the steepest part of the cam 27 and the spring 29 is producing an abrupt counter-clockwise pivoting of the lever 23. The piston 14 therefore rises and the pilot fuel supplied through the bore 11' to the delivery chamber of the cylinder 13 is delivered through the bore 9' at high pressure to the nozzle 1 (see FIG. 3) just at the time when the piston part 14' completely covers the bore 11'. The delivery stroke ends when the edge 16 opens the bore 11' covered by the piston part 14'. The high pressure in the line 9 then decreases through the bores 17, 18 in the piston 14 to the pressure at which the pilot fuel is being supplied through the line 11. Consequently, while the high pressure is operative in the line 9, the valve needle 7 opens and pilot fuel is injected into the combustion chamber 3 (see FIG. 3). The pilot fuel burning therein ignites the difficult-to-ignite main fuel then supplied through the line 6'.

Since the edges 15, 16 of the piston part 14' extend parallel to one another, only the start and end of injection of the pilot fuel are determined, that is, the injection phase (duration of injection) is always constant.

Because of the strong tension spring 29, the injection phase can be reduced to less than ten percent of the main fuel injection phase as compared with conventional displacement pumps in which a piston is moved directly by a cam. Consequently, pilot fuel consumption is reduced considerably.

The piston 14 can be rotated by means of the rack 20 and ring 19 in order to vary the start of pilot fuel injection relative to the start of main fuel injection. No pilot fuel quantity adjustment is necessary so that the construction of the system is simplified.

Referring to FIG. 4, when the roller 26 has left the steep part of the camming surface as the cam 27 rotates clockwise, the lever 23 gradually pivots clockwise so that the piston 14 descends until reaching the lowest position which corresponds to a time when the roller 26 is near the highest point of the cam 27.

Referring to FIG. 5, in another embodiment, the pilot fuel injection nozzle 31 can be constructed with a gallery 32 for receiving pilot fuel at the injection pressure. This gallery 32 communicates by way of a bore 33 with a chamber 34 in which a valve needle 35 is disposed for controlling a flow of the pilot fuel from the gallery 32 to the combustion chamber (not shown). The valve needle 35 cooperates with a sealing seat in the valve body in order to control the injection of fuel through spray apertures 36 into the combustion chamber (not shown). In addition, the valve needle 35 is guided in a bore in the valve body which extends from the chamber 34 upwardly and is provided with a thickened end in piston-fashion. This thickened end is guided in a correspondingly larger bore in the valve body with the bore communicating with a duct 37 which, in turn, is connected via a line 38 with a control means 39 for controlling the supply and discharge of a hydraulic pressure medium to and from the thickened end of the needle 35. Another duct is also connected to the top end of the bore which receives the thickened end of the valve needle 35 and extends to a discharge line 40 for the hydraulic pressure medium.

A biasing piston 41 is guided coaxially of the valve needle 35 in a bore of the injection valve body. This biasing piston 41 is of smaller diameter than the piston-like thickened end of the valve needle 35 but is of a greater diameter than the valve needle part below the thickened end of the needle. The bore in which the piston 41 moves is connected with a duct 42 which extends to the gallery 32 to that the piston 41 communicates with the pilot fuel in the gallery 32. The diameters of the piston 41 and the valve needle part are such that the pressure of the pilot fuel in the gallery 31 maintains the valve needle 35 closed in intervals between injection phases.

The gallery 32 also communicates by way of a pressure line 43 with a displacement pump 44 which delivers pilot fuel at the full injection pressure to the gallery 32.

In addition, a main fuel injection nozzle 46 is provided for the injection of the main fuel. As indicated, the nozzle 46 also has a gallery and is supplied with the main fuel through a line 47. The main fuel can be a suspension of finely divided particles of fuel, such as coal, in a liquid, such as water.

Basically, the main injection nozzle 46 is of similar construction to the pilot injection nozzle 31, that is, the main injection nozzle 46 has a biasing piston and a valve needle with a thickened piston like top end. A line 48 is also provided to carry hydraulic pressure medium from the suitable source. This line 48 corresponds to the pilot fuel supply line 38 associated with the pilot fuel injection nozzle 31. The line 48 carries the pressure medium to the underside of the piston-like thickened end of the valve needle. However, the biasing piston associated with the main fuel is subject not to the pressure of the main fuel in the gallery but to the pressure of the pilot fuel in the line 43. To this end, a branch line 43′ communicates the pilot fuel line 43 with the bore which receives the biasing piston in the nozzle 46.

In other respects, the main fuel injection nozzle 46 is constructed as described in U.S. Pat. No. 4,662,315.

Referring to FIG. 6, the control means 39 for controlling the pilot fuel injection phase of the injection nozzle 31 is in the form of a device which includes a casing 50 having a central bore 51 and a pair of diametrically disposed bores 38′, 57′ which communicate with the central bore 51 in order to pass a flow of liquid pressure medium therethrough. In addition, the device 39 has a sleeve or bush 52 mounted in the central bore 51 of the casing 50. This sleeve 52 has a pair of circumferentially elongated and oppositely disposed peripheral grooves 55,56 each of which is in communication with a respective one of the bores 57′, 38′ of the casing 50. The sleeve 52 also has a pair of radial bores 53, 54, each of which is in communication with a respective one of the grooves 56, 55. A means for rotating the sleeve 52 is also provided in the form of a pivoting lever 65 for adjusting the sleeve 52 in the casing 50.

In addition, the control device 39 includes a valve spool 61 which is rotatably mounted within the sleeve 52 in order to rotate in a counter-clockwise manner, as viewed, at half the speed of a cam shaft which would otherwise be provided. This spool 61 is formed with a continuous cross-bore 62 for cyclically communicating with the radial bores 53,54 of the sleeve 52.

As indicated, the upper bore 38′ of the casing communicates with the line 38 (see FIG. 5) which extends to the duct 37 in the pilot fuel injection nozzle 31. The lower bore 57′ connects with a line 57 in which a delivery pump 58 is disposed for delivering hydraulic pressure medium from a suitable source for actuating the valve needle 35 of the injection nozzle 31. A pressure controller 59 in the form of a relief valve and a gallery 60 are connected to the line 57. The gallery 60 serves to receive the normally constant delivery of the pump 58 in the phases in which the flow of hydraulic medium to the nozzle 31 is interrupted.

With the spool 61 in the position illustrated, the cross-bore 62 communicates simultaneously with the bores 53, 54 in the sleeve 52 so that hydraulic pressure medium flows from the line 57 to the line 38 and, thence, through the duct 37 in the nozzle 31 to below the piston-like thickened end of the valve needle 35 (see FIG. 5). The pressure of this pressure medium is high enough to exert a force on the underside of the thickened end of the valve needle to overcome the force exerted by the pilot fuel in the gallery 32 on the biasing piston 41. The valve needle 35 therefore disengages from the seat and pilot fuel is injected through the duct 33 and spray apertures 36 into the combustion chamber (not shown).

Of note, injection starts when the boundary of the cross-bore 62 which is illustrated on the left in FIG. 6 passes the right-hand boundary edge of the bore 53 as the spool 61 rotates counter-clockwise. At this time, the cross-bore is already communicating via the bore 54 with the pressure medium supply. The end of the pilot fuel injection phase occurs when that boundary of the cross bore 62 which is on the left in FIG. 6 passes over the right-hand boundary of the bore 54 thus interrupting the supply of pressure medium to the cross bore 62.

Simultaneously, as the right-hand boundary of the bore 54 is passed over, the right-hand boundary of the cross-bore passes over the left-hand boundary of an axial discharge groove 63 in the sleeve 52 so that the pressure of the pressure medium in the line 38 drops. As a result, the valve needle 35 moves back and cuts off the supply of pilot fuel from the chamber 34 to the spray apertures 36.

As indicated, the relationship between the cross bore 62 and the bores 53, 54 is such that the simultaneous communication of the cross-bore 62 with the radial bores 53,54 determines the pilot fuel injection phase.

The lever 65 which is connected to the sleeve 52 serves to adjust the sleeve 52 within the casing. In this way, the start of pilot fuel injection can be advanced or retarded by pivoting the lever 65 in one direction or the other so as to adapt the main fuel injection.

The control device of FIG. 5 has an advantage over the injection pump of FIG. 4 in that the pressure of the pressure medium acting on the piston-like thickening of the valve needle can be only a small proportion of the pilot fuel injection pressure. Another advantage is that a substantially rectangular pressure profile can be achieved immediately before the spray apertures as compared with a substantiallly triangular pressure profile in the injection pump 10 of FIG. 4. Consequently, the injection time for a given quantity of pilot fuel can be approximately halved. Still another advantage is the non-oscillating closure of the valve needle due to the absence of a closing spring.

The spool 61 permits a very short pilot fuel injection time since this time depends upon the angle at which the bores 53, 54 are disposed to one another in sleeve 52. As indicated in FIG. 6, the bores 53, 54 are disposed in non-diametric relation to each other.

Of note, instead of using the control device 39 of FIG. 4, the injection pump 10 of FIG. 4 can be used to convey the hydraulic pressure medium to disengage the valve needle 35 from its seat during the injection phase.

Referring to FIG. 7, the pilot fuel injection nozzle 71 may be constructed with a gallery 72 which is adapted to receive pilot fuel at injection pressure and may be connected by way of a line 73 with a displacement pump 74. In addition, a branch line 73′ extends from the line 73 to a main fuel injection nozzle 76 which is of similar construction to the nozzle 46 of FIG. 5. That is, the main fuel is supplied through a line 77 while a hydraulic pressure medium for opening a valve needle (not shown) is supplied through a line 78.

The pilot fuel injection nozzle 71 also has a valve needle 85 which extends into a chamber 84 to block the flow path of pilot fuel to a plurality of spray apertures 86 leading to a combustion chamber (not shown). In addition, a biasing piston 81 is located within the valve body to seat against a thickened end of the valve needle 85 in a manner as described above. Further, a duct 82 extends within the valve body to communicate the top end face of the biasing piston 81 with a line 90 which is connected by way of an electromagnetic changeover valve 91 of a control means to the line 73. A discharge line 92 is also connected to the valve 91 for purposes as described below while a signal line 93 is connected to the changeover valve 91 to deliver a signal from a signal sender (not shown).

In this injection system, the pilot fuel in the line 90 acts by way of the biasing piston 81 to control the movement of the valve needle 85. Consequently, the valve needle 85 need not have a thickened piston-like top end.

With the valve 91 in the position shown in FIG. 7, the full pilot fuel pressure is operative by way of the line 90 and duct 82 on the biasing piston 81 so as to maintain the valve needle 85 closed between injection phases. Because of the relatively narrow cross-section needle 85, the pilot fuel pressure which is also operative via the duct 83 in the chamber 84 cannot produce an opening movement. When the valve 91 is changed over, the supply of pilot fuel to the line 90 ceases and the line 90 is connected to the discharge line 92. Consequently, the pressure in the line 90 and duct 82 decreases and the closing force previously operative on the biasing piston 81 ceases. The pilot fuel pressure which is operative in the chamber 84 thus raises the valve needle 85 and pilot fuel is injected through the spray apertures 86 into the combustion chamber (not shown). Pilot fuel injection terminates when the valve 91 is returned to the position shown in FIG. 7.

By means of an appropriate signal transmission through the signal line 93, the duration of pilot fuel injection can be made very short and the start of injection can be adjusted relative to the main fuel injection through the nozzle 76.

Of note, the pilot fuel injection nozzles can be in the form of a single spray aperture instead of three or two spray apertures.

The invention thus provides a fuel injection system wherein the pilot fuel injection phase is less than ten percent of the main fuel injection phase. Because of this, the amount of pilot fuel which is to be expended within the system can be significantly reduced.

The invention also provides relatively simple control means for controlling the pilot fuel injection phase relative to the main fuel injection phase.

What is claimed is:

1. A method for injecting fuel into a combustion chamber of a reciprocating internal combustion engine operating according to the diesel process whereby
a liquid main fuel which is of low ignition quality is injected into the combustion chamber by a first injection nozzle during a main fuel injection phase and
a pilot fuel is injected into said combustion chamber by a second injection nozzle during a pilot fuel injection phase,
characterized in
that during the injection phase of the main fuel the pilot fuel is being injected at a duration which is less than ten percent of the injection phase of the main fuel,
that the beginning of pilot fuel injection phase relative to the beginning of the main fuel injection phase is such that the pilot fuel injected into said combustion chamber meets the main fuel injected into said combustion chamber essentially half way between said two nozzles,
that the distance A between the pilot fuel nozzle and the main fuel nozzle is selected according to the formula $$A = 2t_v c_B,$$

whereby $t_v$ represents the ignition lag of the pilot fuel and $c_B$ represents the exit velocity of the pilot fuel from the second nozzle, and
that the duration of ignition of the pilot fuel is less than the time $t_v$.

2. In a system for injecting fuel into a combustion chamber of a reciprocating diesel internal combustion engine, the combination of
a cylinder cover over said combustion chamber;
a first injection nozzle in said cover having a plurality of spray apertures for injecting a liquid main fuel into the combustion chamber during a main fuel injection phase;
a second injection nozzle in said cover having from one to three spray apertures for injecting a pilot fuel into the combustion chamber during a pilot fuel injection phase; and the axes of adjacent spray apertures of said two nozzles are inclined to meet in the middle between said two nozzles.

3. In a system for injecting fuel into a combustion chamber of a reciprocating diesel internal combustion engine, the combination of
a first injection nozzle for injecting a liquid main fuel into the combustion chamber during a main fuel injection phase;
a second injection nozzle for injecting a pilot fuel into the combination chamber during a pilot fuel injection phase, said second injection nozzle including a gallery for receiving pilot fuel at injection pressure, a valve needle for controlling a flow of the fuel from said gallery to the combustion chamber, said valve needle having a thickened end, a biasing piston communicating with said gallery and contacting said end of said valve needle for maintaining said valve needle closed in intervals between injection phases, and a source of hydraulic pressure medium communicating through said control means with said end of said needle on a side opposite said biasing piston to oppose a closing force of said biasing piston.

4. A system as set forth in claim 3 wherein said control means includes an injection pump having a cylinder, a fuel supply orifice in said cylinder to receive a supply of fuel, a fuel delivery orifice in said cylinder to eject fuel therefrom, a piston reciprocally mounted in said cylinder for ejecting pilot fuel from said cylinder through said fuel delivery orifice, said piston including a pair of parallel bevelled edges cooperating with said fuel supply orifice whereby one edge determines a start of said pilot fuel injection phase and the other edge determines the end of said pilot fuel injection phase, a pivotally mounted lever bearing on said piston at an end remote from said bevelled edges and a tension spring secured to said lever to move said piston abruptly for delivery of pilot fuel through said delivery orifice.

5. A system as set forth in claim 4 wherein said control means includes a rotatable cam engaging said lever in opposition to said tension spring.

6. A system as set forth in claim 4 wherein said piston is rotatably adjustable about a longitudinal axis thereof.

7. A system as set forth in claim 3 wherein said main fuel injection nozzle includes a gallery for receiving main fuel at injection pressure, a valve needle for controlling a flow of the fuel from said gallery to the combustion chamber, a biasing piston for maintaining said valve needle in a closed position in intervals between injection phases.

8. A system as set forth in claim 3 wherein said control means includes a sleeve having a pair of circumferentially spaced radial bores and a rotatable spool within said sleeve having a continuous cross-bore for periodically communicating said radial bores with each other to pass hydraulic pressure medium therethrough to said end of said needle valve.

9. A system as set forth in claim 8 wherein said sleeve is adjustable about said spool.

10. A system as set forth in claim 3 wherein said second injection nozzle further comprises a line extending to said gallery for delivering pilot fuel thereto, a branch line extending from said line to said biasing piston to deliver pilot fuel and wherein said control means includes a changeover valve in said branch line for selectively connecting said line with said biasing piston with said valve needle in a closed position and selectively connecting said branch line to discharge line with said valve needle in an open position.

11. A system as set forth in claim 10 wherein said main fuel injection nozzle includes a gallery for receiving main fuel at injection pressure, a valve needle for controlling a flow of the fuel from said gallery to the combustion chamber, a biasing piston for maintaining said valve needle in a closed position in intervals between injection phases, and a branch line communicating said line supplying pilot fuel with said biasing piston of said main fuel nozzle to maintain said valve needle closed.

* * * * *

UNITED STATES PATENT AND TRADEMARK OFFICE
CERTIFICATE OF CORRECTION

PATENT NO. : 4,748,949
DATED : June 7, 1988
INVENTOR(S) : Anton Steiger

It is certified that error appears in the above-identified patent and that said Letters Patent is hereby corrected as shown below:

```
Column 2, line  1, cancel "is"
Column 2, line 24, "to" should be --to a--
Column 4, line  2, "excentrically" should be --eccentrically--
Column 4, line  7, "enclosed" should be --enclose--
Column 4, line 20, "analog" should be --analogous--
Column 4, line 22, "excentricity" should be --eccentricity--
Column 4, line 33 "(10)" should be --(10%)--
Column 4, line 40, "as much as" should be --wherein--
Column 7, line  1, "31" should be -- 32 --
```

Signed and Sealed this

Twenty-second Day of November, 1988

Attest:

DONALD J. QUIGG

*Attesting Officer*     *Commissioner of Patents and Trademarks*